US008025275B2

(12) United States Patent
Wong

(10) Patent No.: US 8,025,275 B2
(45) Date of Patent: Sep. 27, 2011

(54) SINGLE HAND OPERATED RATCHET CLAMP

(76) Inventor: Harry Wong, South Pasadena, CA (US)

( * ) Notice: Subject to any disclaimer, the term of this patent is extended or adjusted under 35 U.S.C. 154(b) by 434 days.

(21) Appl. No.: 12/287,299

(22) Filed: Oct. 7, 2008

(65) Prior Publication Data

US 2010/0084799 A1 Apr. 8, 2010

(51) Int. Cl.

| | |
|---|---|
| ***B25B 1/00*** | (2006.01) |
| ***B25B 5/00*** | (2006.01) |
| ***B25B 1/02*** | (2006.01) |
| ***B25B 5/02*** | (2006.01) |
| ***B25B 27/14*** | (2006.01) |
| ***B23P 19/04*** | (2006.01) |

(52) U.S. Cl. ................ 269/6; 269/3; 269/249; 269/149; 269/214; 29/257; 29/276

(58) Field of Classification Search .................. 269/3, 6, 269/214, 149, 249; 29/257, 276
See application file for complete search history.

(56) References Cited

U.S. PATENT DOCUMENTS

| | | | | |
|---|---|---|---|---|
| 5,843,099 | A * | 12/1998 | Nichols et al. | 606/144 |
| 5,935,097 | A * | 8/1999 | Metsch et al. | 604/27 |
| 6,763,543 | B2 * | 7/2004 | Rivera | 7/128 |
| 6,923,756 | B2 * | 8/2005 | Sudakov et al. | 600/101 |
| 6,968,644 | B1 * | 11/2005 | Garcia | 43/4 |
| 7,222,842 | B2 * | 5/2007 | Lin | 269/6 |
| 7,938,810 | B2 * | 5/2011 | Spranza et al. | 604/264 |
| 2006/0288821 | A1 * | 12/2006 | Girard | 81/58.1 |

* cited by examiner

*Primary Examiner* — Jackie Ho
*Assistant Examiner* — Nirvana Deonauth

(57) ABSTRACT

A single hand operated ratchet clamp comprises a finger ring lever and a typical ratchet clamp having a slide rail, a sliding arm, a fixed arm, and a lever element with pressure plate. The finger ring lever is pivoted to the free end of the lever element so that the ratchet clamp can be operated with one hand only.

4 Claims, 2 Drawing Sheets

SINGLE HAND OPERATED RATCHET CLAMP

REFERENCE

U.S. Patent Documents

| | | |
|---|---|---|
| 6,641,122 | November 2003 | Hans Roesch |
| 7,222,842 | May 2007 | Chian Ling Lin |

BACKGROUND OF THE INVENTION

1. Field of the Invention

The present invention relates to a class of ratchet clamp or lever clamp in general, and particularly to single hand operated ratchet clamp. A finger ring lever is attached to the free end of the lever element of the ratchet clamp for inserting one of operator's fingers so that the ratchet clamp can be operated to clamp workpiece(s) with one hand.

2. Description of the Related Art

A typical ratchet clamp comprises a slide rail, a fixed arm, a sliding arm which is free to slide over the slide rail, a lever element which is mounted in a pivotable manner on the sliding arm and a pressure plate which is mounted on the sliding arm and can be displaced transversely to the sliding arm pushing the workpiece against the fixed arm by the turning of the lever element. However, this clamping action on a workpiece usually requires two hands of an operator, with one hand holding the slide rail and the other hand operating the lever element due to the distance between the slide rail and the free end of the lever element. In this case, one may need a helping hand from other person to hold the workpiece(s) so that the clamping job can be completed. The present invention is devised to solve this problem.

SUMMARY OF THE INVENTION

The present invention comprises a ratchet clamp or lever clamp and a finger ring lever pivoted to the free end of the lever element. In order to clamp workpiece(s) with the present invention, an operator may hold the slide rail with one hand, push the sliding arm towards the fixed arm until the gap between the fixed arm and the sliding arm is slightly larger than the size of the workpiece(s) to be clamped, insert one of the five fingers of the same hand of the operator to the finger ring lever while holding the slide rail with the other four fingers, hold and place the workpiece(s) with the other hand between the fixed arm and the sliding arm, turn the lever element towards the slide rail so that the pressure plate is pushed towards the workpiece(s), and hence the workpiece(s) is(are) clamped between the fixed arm and the sliding arm. This clamping operation not only frees one hand of the operator for holding the workpiece(s) but it is faster also.

DETAILED DESCRIPTION OF THE INVENTION

With the help of the drawings and the detail description below, the features of the present invention will be apparent and fully understandable.

Figure 1:
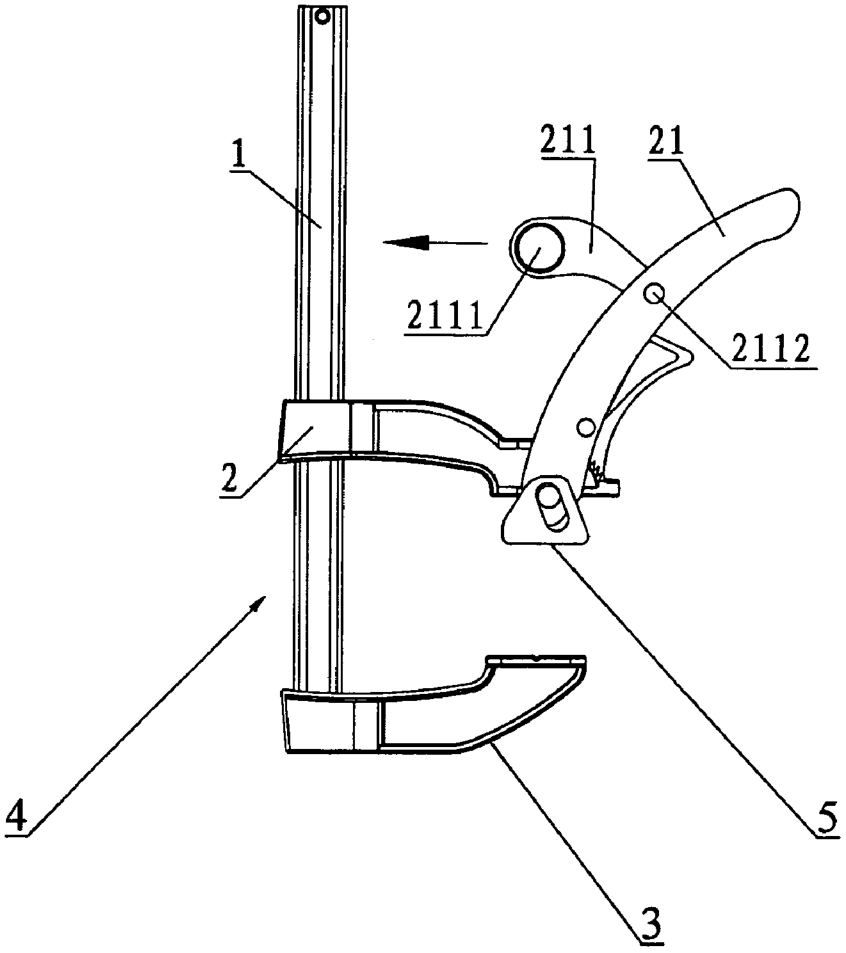
FIG. 1 is a side view of the present invention with finger ring lever.
Figure 2:
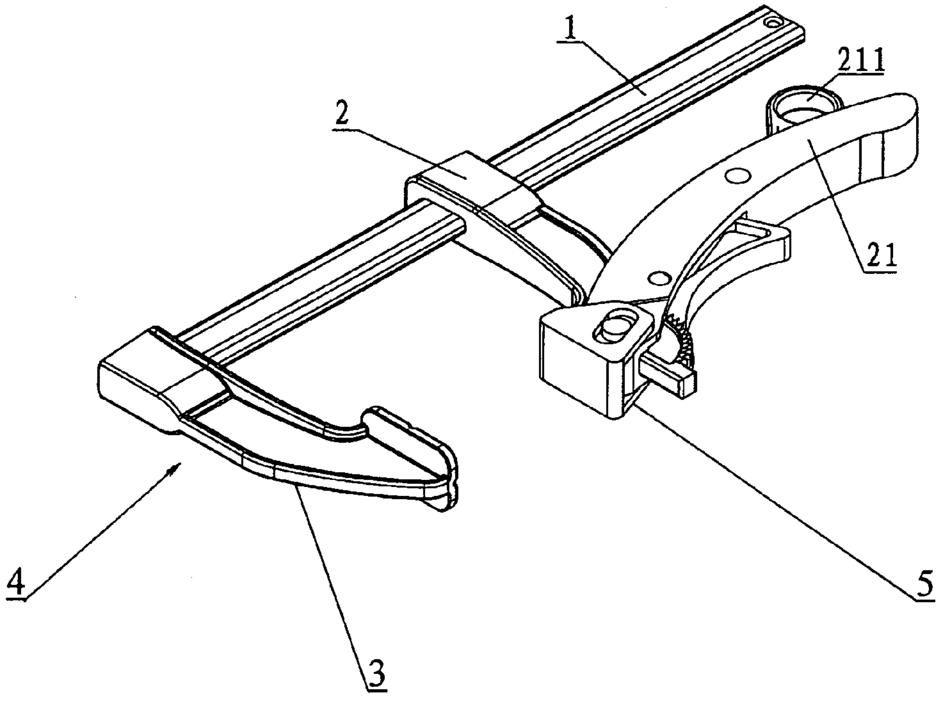
FIG. 2 is a perspective view of the present invention with finer ring lever.

Referring to FIG. 1 and FIG. 2, the present invention comprises a finger ring lever 211 and a typical ratchet clamp 4 having a slide rail 1, a sliding arm 2, a fixed arm 3, and a lever element 21 with pressure plate 5. Sliding arm 2 is free to slide over slide rail 1. Lever element 21 is pivoted to the free end of the sliding arm 2. When the lever element 21 is turned with its free end towards the slide rail 1, the pressure plate 5 will be pushed towards the fixed arm 3 and hence a workpiece or workpieces can be clamped between the pressure plate 5 and the fixed arm 3. Finger ring lever 211 is pivoted to the free end of the lever element 21 and when not in use, it can be placed inside a recess area at the free end of the lever element 21. The free end of the finger ring lever 211 is equipped with a round hole 2111 with the size big enough to insert the thumb of any person.

To clamp a workpiece or workpieces with the present invention using one hand, an operator will hold the slide rail 1 with four fingers of one hand, push the sliding arm 2 with the remaining finger of the same hand towards the fixed arm 3 until the gap between the pressure plate 5 and fixed arm 3 is a bit bigger than the size of the workpiece(s). Put one of the five fingers of the same hand into the round hole 2111 of the finger ring lever 211 and pull the finger ring lever 211 towards the slide rail 1 while holding the workpiece(s) between the pressure plate 5 and the fixed arm 3 with the other hand. The pulling action on the finger ring lever 211 will turn the lever element 21 so that the pressure plate 5 is pushed towards the fixed arm 3 and as a result, the workpiece(s) is(are) clamped by the pressure plate 5 and the fixed arm 3. The clamping operation is completed by operating on the present invention with one hand while holding the workpiece(s) with the other hand.

What I claim as my invention is:

1. A single hand operated ratchet clamp comprising:

a typical ratchet clamp having a slide rail, a sliding arm, a fixed arm, a lever element and a pressure plate;

a finger ring lever pivoted to the free end of said lever element; and a round hole made at the free end of said finger ring lever.

2. The single hand operated ratchet clamp according to claim 1, wherein said finger ring lever is pivoted to the side of said lever element facing said slide rail.

3. The single hand operated ratchet clamp according to claim 1, wherein said round hole is made to have a diameter big enough for inserting the thumb of any person.

4. The single hand operated ratchet clamp according to claim 1, wherein a recess area is made at the free end of said lever element on the side facing said slide rail for placing said finger ring lever when not in used.

* * * * *